Figure 1:
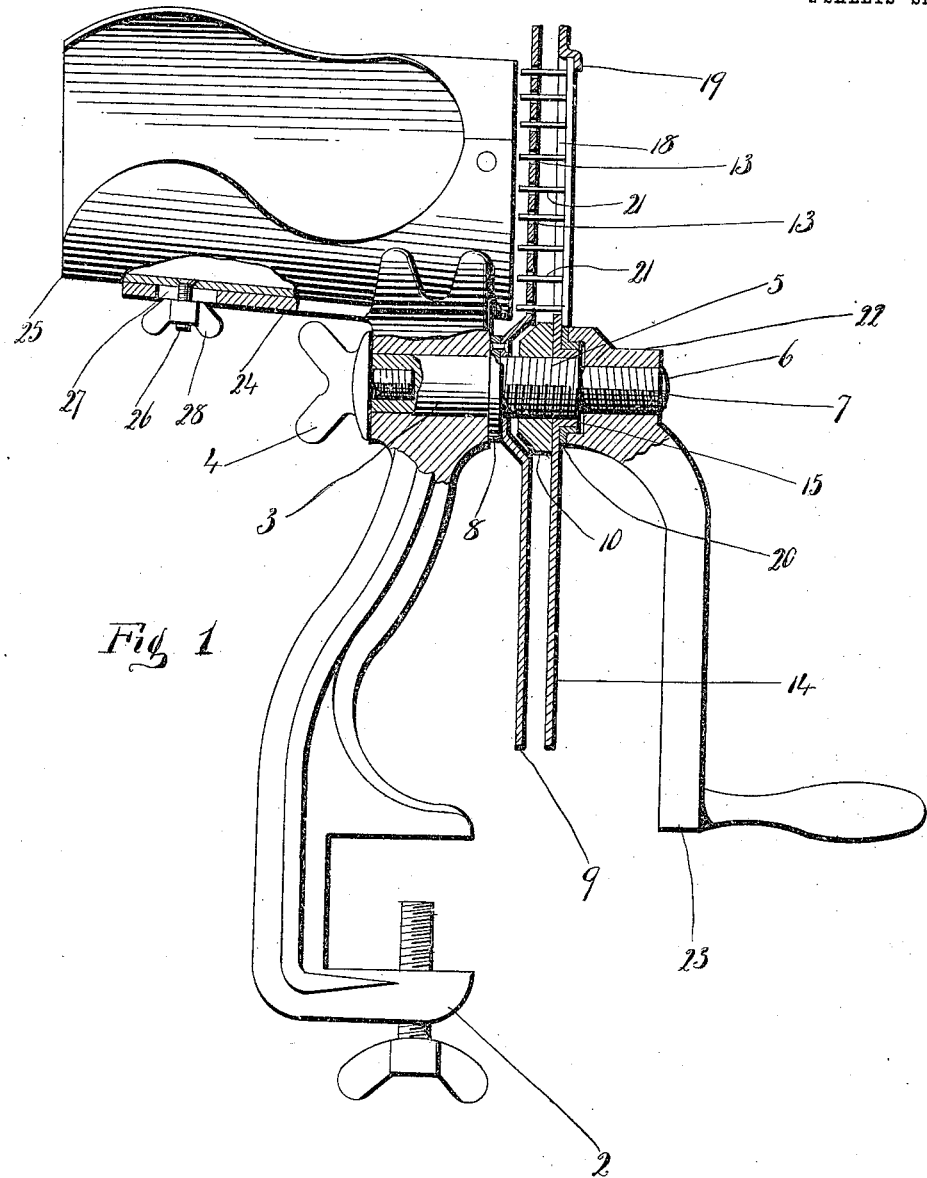

J. ANDERSON.
FOOD CUTTER.
APPLICATION FILED JUNE 21, 1909.

952,665.

Patented Mar. 22, 1910.

2 SHEETS—SHEET 1.

Witnesses
C. J. Reed.
C. L. Reed.

John Anderson
Inventor
by Seymour Earle
Atty

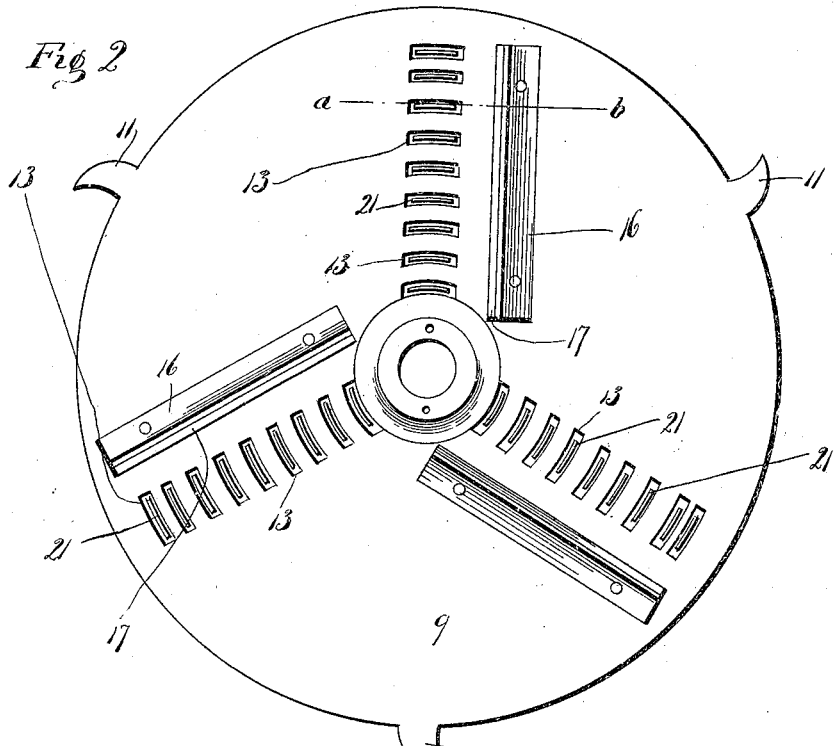
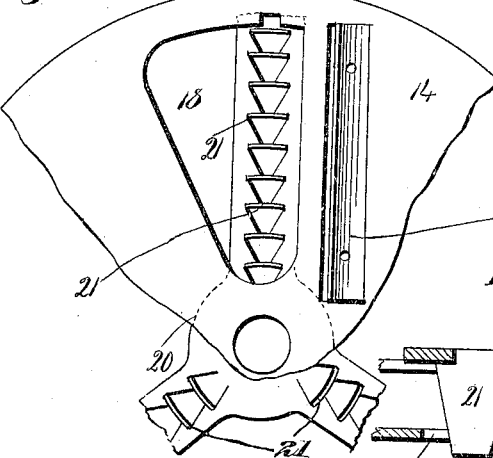
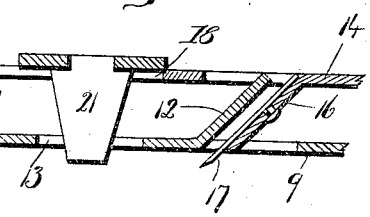

UNITED STATES PATENT OFFICE.

JOHN ANDERSON, OF PORTLAND, CONNECTICUT.

FOOD-CUTTER.

952,665.  Specification of Letters Patent.  Patented Mar. 22, 1910.

Application filed June 21, 1909. Serial No. 503,292.

*To all whom it may concern:*

Be it known that I, JOHN ANDERSON, a citizen of the United States, residing at Portland, in the county of Middlesex and State of Connecticut, have invented a new and useful Improvement in Food-Cutters; and I do hereby declare the following, when taken in connection with the accompanying drawings and the numerals of reference marked thereon, to be a full, clear, and exact description of the same, and which said drawings constitute part of this specification, and represent, in—

Figure 1 a side view partially in section of a food cutter embodying my invention. Fig. 2 a plan view of the inner face of the guide-disk showing the cutters projecting through them. Fig. 3 a broken plan view of the cutter-disk. Fig. 4 a sectional view on the line *a—b* of Fig. 2.

This invention relates to an improvement in food cutters, and particularly to food cutters of the slicer type, the object of the invention being a simple construction of parts which provides for adjustment of the cutting blades, and also provides for transverse cutting as well as for slicing; and the invention consists in the construction hereinafter described and particularly recited in the claims.

In carrying out my invention I employ a frame 2 adapted to be secured to a table or other convenient means. Mounted in the upper end of this frame is a shaft 3 held in position by a set screw 4. This shaft has left hand threads 5, and the outer end 6 is reduced in diameter and has right hand threads 7. The shaft is also formed with a flange 8 to which a guide-disk 9 is riveted, this guide-disk being cupped at its center so as to provide clearance for a bearing nut 10 which is turned onto the threads 5. This disk 9 is provided with radial projections 11 for the purpose as will hereinafter appear, outwardly extending lips 12 arranged parallel with a radial line, and adjacent to each lip are a series of transverse cutter-slots 13.

Mounted upon the shaft and against the bearing nut 10 is a cutter-disk 14. This disk, like the guide-disk 9, may be struck up from sheet metal and formed with a centrally arranged sleeve or hub 15 to ride upon the threads 5. This cutter-disk is formed with a series of blade supports 16 extending inward from the cutter-disk and parallel with the lips 12, and to each support a blade 17 is riveted. Adjacent to each blade is a clearance opening 18 in line with the slots 13, and at the top of each clearance opening 18 is a lip 19.

Mounted upon the hub 15 of the cutter-disk is a three-armed cutter 20 having a series of blades 21 cut from the arms and extending through the clearance hole 18 and the holes 13. The cutter-disk 14 and the cutters 20 are clamped against the nut 10 by a nut 22 formed as a part of a handle 23, and are held by the lip 19.

Mounted upon a rearwardly extending arm 24 of the frame 2 is a hopper 25 standing in a plane at a right angle to the plane of the guide-disk 9. This hopper is provided with a screw 26 which extends through a slot 27 formed in the arm 24 so that it may be moved back and forth, and secured by a thumb nut 28. If the device is to be used as a slicer the cutter 20 will be omitted, and the extent to which the cutting blades 17 will project beyond the guide-disk 9 may be regulated by the location of the nut 10, which may be moved back and forth on the shaft 3. For shredding the cutter 20 will be employed, and the cutting blades it will be seen are arranged in advance of the slicing blades 17 so that as the disk revolves the article to be shredded will first be cut by the cutters 21 and then shaved off by the blades 17. The cutters will be clamped against the bearing nut 10 by the handle.

When it is desired to change the adjustment the guide-disk 9 will be held stationary and this may be conveniently done by the projections 11 and the handle 23 turned in the reverse direction. This will remove the handle from the end of the shaft so that the cutters may be removed and the bearing-nut 10 turned in or out accordingly as it is desired to have the cutting blades project to a greater or less extent beyond the inner face of the guide-disk 9. The lips 12 direct the material cut through the openings in the cutter-disk formed by turning the cutter-bearings inward.

I claim:—

1. A food cutter comprising a frame having a horizontal shaft mounted therein, the end of the shaft being reduced, the shaft having left hand threads and the reduced portion right hand threads, a guide-disk connected with said shaft and formed with outwardly projecting lips, a bearing-nut mounted on said shaft, a cutter-disk mounted on said shaft and adapted to be clamped against the bearing-nut, said cutter-disk having inwardly projecting blade supports arranged parallel with said lips, cutting-blades connected to said supports, and a hopper mounted at the upper end of said frame.

2. A food cutter comprising a frame having a horizontal shaft mounted therein, the end of the shaft being reduced, the shaft having left hand threads and the reduced portion right hand threads, a guide-disk secured to said shaft and centrally cupped and formed with outwardly projecting lips arranged parallel with a radial line, and with a series of slots adjacent to said lips, a bearing-nut on said shaft, a cutter-disk mounted on said shaft and formed with inwardly projecting blade supports parallel with said lips, blades secured to said supports, clearance openings adjacent to each blade, and a cutter connected with the outer face of said cutter-disk and provided with a series of inwardly projecting cutters extending through the clearance openings and through the slots in the guide-disk, and means for clamping said cutters to the shaft, and a hopper mounted at the upper end of said frame.

In testimony whereof, I have signed this specification in the presence of two subscribing witnesses.

JOHN ANDERSON.

Witnesses:
FREDERIC C. EARLE,
CLARA L. WEED.